United States Patent [19]
Jeong et al.

[11] Patent Number: 5,529,036
[45] Date of Patent: Jun. 25, 1996

[54] ROTATABLE SHROUDED VALVE FOR IMPROVING A SCAVENGING OF 2-STROKE ENGINE

[75] Inventors: Young-Il Jeong; Jang-Hee Lee; Kern-Yong Kang, all of Daejeon-Si, Rep. of Korea

[73] Assignee: Korea Institute of Machinery & Metals, Daejon-Si, Rep. of Korea

[21] Appl. No.: 383,374

[22] Filed: Feb. 3, 1995

[30] Foreign Application Priority Data

Jul. 14, 1994 [KR] Rep. of Korea ................. 94-16912

[51] Int. Cl.⁶ .................................................... F01L 3/06
[52] U.S. Cl. ................... 123/188.14; 123/188.3; 123/188.7; 251/318
[58] Field of Search ................. 123/188.14, 188.3, 123/188.7, 65 VB; 251/266, 270, 318

[56] References Cited

U.S. PATENT DOCUMENTS

| | | | |
|---|---|---|---|
| 2,768,617 | 10/1956 | Tierney, Jr. et al. | 123/188.7 |
| 3,757,757 | 9/1973 | Bastenhof | 123/188.1 |
| 4,309,969 | 1/1982 | Matthes | 123/188.7 |
| 4,320,725 | 3/1982 | Rychlik | 123/188.14 |
| 4,355,604 | 10/1982 | Chaibongsai | 123/188.7 |
| 4,389,988 | 6/1983 | Ong | 123/188.14 |
| 4,539,954 | 9/1985 | Klomp | 123/188.14 |
| 4,744,340 | 5/1988 | Kirby | 123/188.14 |
| 5,255,649 | 10/1993 | Isaka | 123/188.14 |

FOREIGN PATENT DOCUMENTS 55216  5/1979  Japan .................. 123/188.14

*Primary Examiner*—Erick R. Solis
*Attorney, Agent, or Firm*—Nikaido Marmelstein Murray & Oram

[57] ABSTRACT

This invention relates to a scavenging shroud mechanism for improving scavenging of a 2-stroke engine, and more particularly to a scavenging shroud mechanism for improving scavenging of a 2-stroke engine which is constructed such that a scavenging shroud mechanism is provided to a scavenging valve whereby compressed air sucked into an interior of a combustion chamber makes a tumble phenomenon along with cylinder wall surface and thereby pushes out already burned burnt gas and simultaneously is capable of efficiently feeding new air so that efficient reverse loop scavenging system is made. The scavenging shroud mechanism has a baffle 2, shroud guide notch 3 and a shroud neck 4, and a fixed supporting pin 6 and a supporting guide 5 provided on the inner side of the intake manifold 9. A shroud guide notch 3 is provided in the baffle 2 so as to permit the scavenging shroud mechanism 1 to up and down-ward movement but not right and left rotational movement.

1 Claim, 2 Drawing Sheets

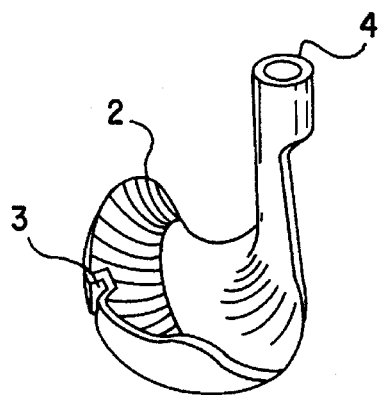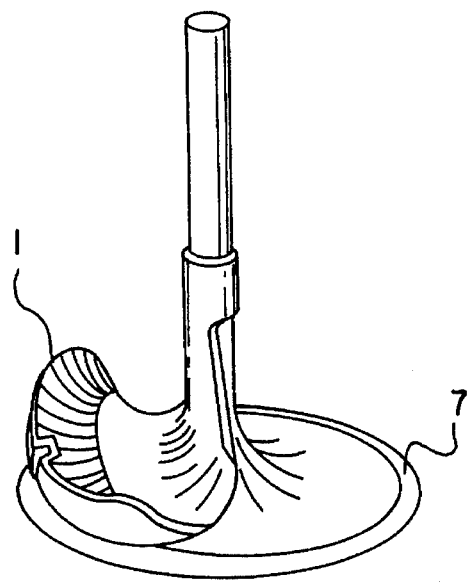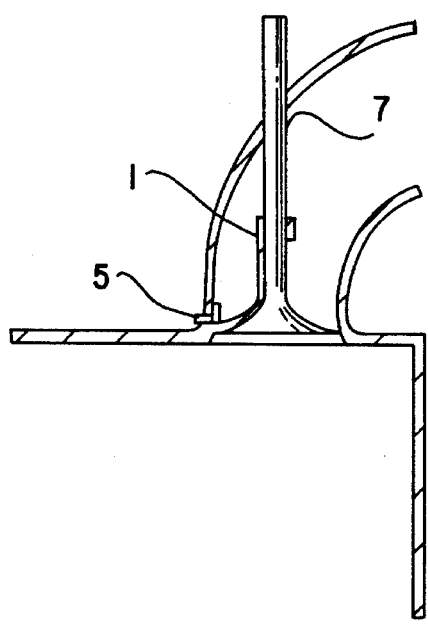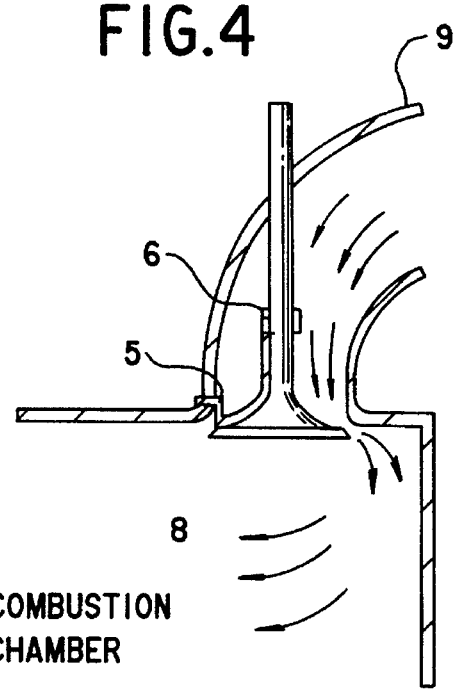

ROTATABLE SHROUDED VALVE FOR IMPROVING A SCAVENGING OF 2-STROKE ENGINE

BACKGROUND OF THE INVENTION

The present invention relates to a scavenging shroud mechanism for improving scavenging of a 2-stroke engine. More particularly to a scavenging shroud mechanism for improving scavenging of a 2-stroke engine in which a scavenging shroud mechanism is provided to a scavenging valve whereby compressed air sucked into the interior of the combustion chamber makes a tumble phenomenon along the cylinder wall surface and thereby pushes out already burned burnt gas and simultaneously is capable of efficiently feeding new air so that an efficient reverse loop scavenging system is carried out.

Since a conventional scavenging valve has a structure in which a simple valve body is opened and closed with respect to a valve seat, new air is not efficiently fed to push out burnt gas within the already burned combustion chamber by compressed air fed through an intake manifold in a short intake and scavenging period, which is a technique to be most used in a kernel 2-stroke engine.

SUMMARY OF THE INVENTION

The present invention is designed to eliminate such conventional disadvantage. The present inventions add a scavenging shroud mechanism to a scavenging valve.

BRIEF DESCRIPTION OF THE DRAWINGS

FIG. 1 is a perspective view of a scavenging shroud mechanism;

FIG. 2 is a perspective view of a structure at a tie when the scavenging shroud mechanism is assembled to a scavenging valve;

FIG. 3 is a diagram of operating state at a time when the scavenging valve is closed; and FIG. 4 is a diagram of operating state at a time when the scavenging valve is opened.

DETAILED DESCRIPTION OF THE INVENTION AND THE PREFERRED EMBODIMENT

Figure 5:
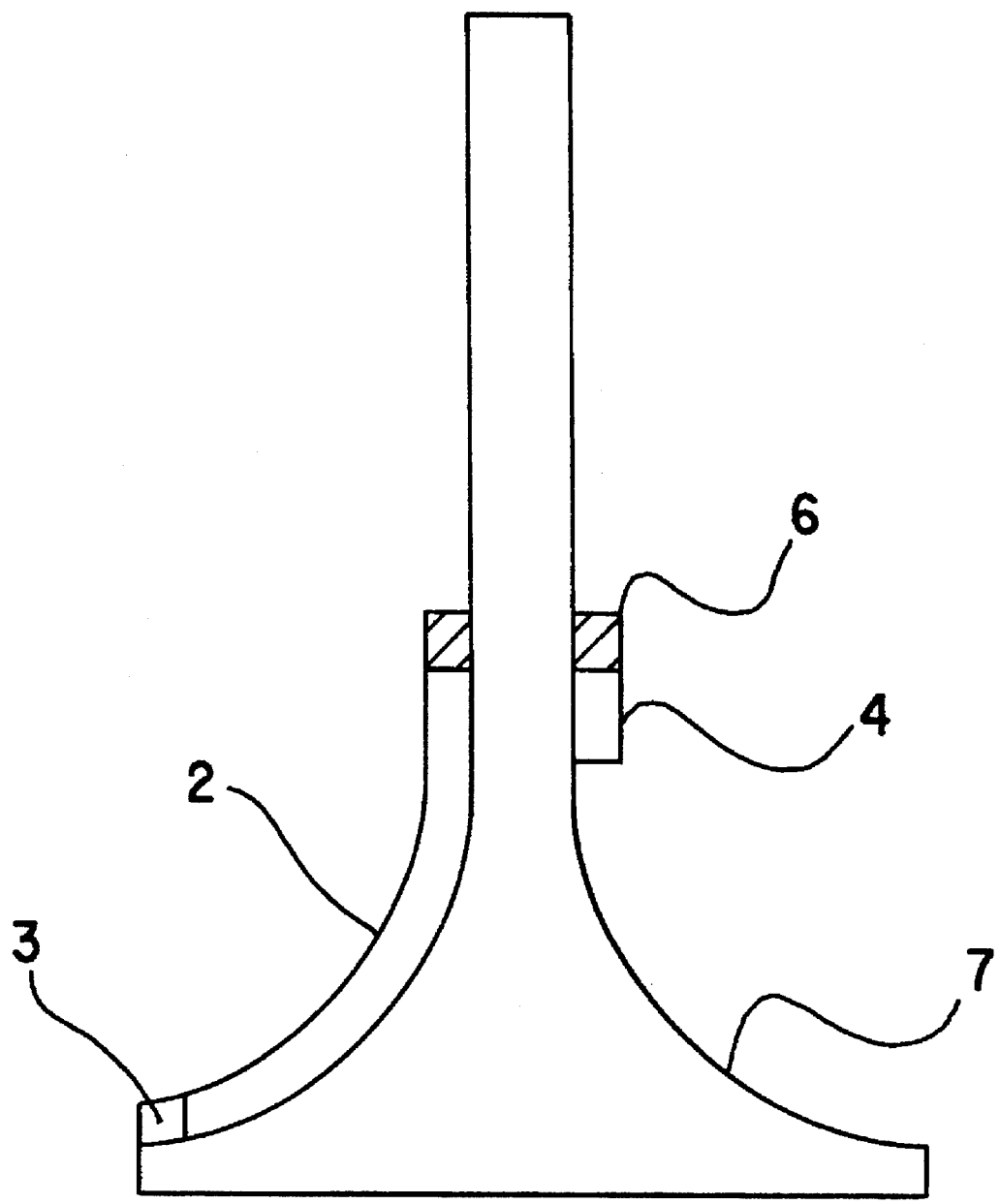
FIG. 5 is a schematic drawing of the shroud valve.

Hereinafter, the present invention will be described in more detail with reference to the accompanying drawings.

In the drawings, the invention includes a scavenging shroud mechanism 1 constructed by a baffle 2, shroud supporter, which may be referred to as a shroud guide notch, 3 and a shroud neck 4, and a supporting pin 6. The supporting pin 6 is provided so as not to be slid in the up or down-ward direction with respect to a scavenging valve 7. A supporting groove which may be referred to as a supporting guide, 5 is provided on the inner side of the intake manifold 9 by making a shroud guide notch 3 in the baffle 2 so as to be inserted to the shroud guide notch 3 such that the scavenging shroud mechanism 1 is capable of up and down-ward movement but not right and left rotational movement.

The operation and effect of this structure will be described more in detail as below. As shown in FIG. 1, a scavenging shroud mechanism 1, a baffle 2, a shroud guide notch 3 and a shroud neck 4 are included, and as shown in an assembled view of FIG. 2, the scavenging shroud mechanism 1 is provided in a scavenging valve 7 through the shroud neck 4. The scavenging valve 7 is capable of up and down-ward movement and right and left rotating movement, and the scavenging shroud mechanism 1 provided to the scavenging valve 7 is made integral with the scavenging valve 7 so as to be capable of up and down-ward movement but not rotating movement in the right and left direction and so as to keep a predetermined position. Accordingly, a supporting pin 6 is provided so as to limit the up and down-ward movement of the scavenging shroud mechanism 1 with scavenging valve 7. A shroud supporter 3 is made in the baffle 2 of the scavenging shroud mechanism 1 so that the supporting guide 5 provided on the inner side of the intake manifold 9 is inserted into this shroud guide notch 3 whereby the scavenging shroud mechanism 1 is capable of up an down-ward movement but not right and left rotating movement. The features of the present invention are as follows.

The technique of most kernel 2-stroke engine is a scavenging technique for pushing out burnt gas within an already burned combustion chamber by compressed air fed through the intake manifold 9 in a short intake and scavenging time period and efficiently feeding in new air.

When viewing the function of the scavenging shroud mechanism 1 of the present invention, as shown in FIG. 3, when the scavenging valve 7 is closed, the compressed air of the intake manifold 9 can not be fed to the engine's combustion chamber 8, but as shown in FIG. 4, when the scavenging valve 7 is opened, the compressed air is sucked to a portion having no scavenging shroud mechanism 1 (the right side of the scavenging valve of FIG. 4). Because the baffle 2 of the scavenging shroud mechanism 1 continuously shuts the intake manifold 9, the compressed air cannot be sucked to this portion (left side of the scavenging valve of FIG. 4).

The compressed air sucked into the interior of the combustion chamber makes a tumble phenomenon along the cylinder wall surface, by this operation whereby pushing out already burned burnt gas and simultaneously being capable of efficiently feeding new air and therefore it makes an efficient reverse loop scavenging system whereby a scavenging improvement of 2-stroke engine is made and hence it can be applied and utilized in designing.

Particularly, the right and left rotating movement of the scavenging valve 7 is operated as normal, and simultaneously the scavenging shroud mechanism 1 is made with its right and left rotating direction fixed while its upward direction can be operated together with the scavenging valve 7, therefore utilization is possible.

What is claimed is:

1. A scavenging shroud mechanism mounted on a valve of an internal combustion engine comprising:

a baffle;

a shroud guide notch and a shroud neck;

a fixed supporting pin for preventing the shroud mechanism from sliding up and down in the valve;

a supporting guide mounted on an inner side of an intake manifold of the internal combustion engine;

wherein the shroud guide notch is disposed in the baffle so as to permit the scavenging shroud mechanism to move in an up and down-ward direction relative to the intake manifold but not a right and left rotational movement.

* * * * *